United States Patent
Künz et al.

(10) Patent No.: US 11,975,474 B2
(45) Date of Patent: May 7, 2024

(54) BLOW MOLDING TOOL AND METHOD FOR THERMALLY PROCESSING A SUBREGION OF A SURFACE OF A PLASTIC CONTAINER

(71) Applicant: ALPLA Werke Alwin Lehner GmbH & Co. KG, Hard (AT)

(72) Inventors: Johann Künz, Hard (AT); Thomas Bohle, Alberschwende (AT); Andre Eyrich, Hörbranz (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 131 days.

(21) Appl. No.: 17/599,769

(22) PCT Filed: Mar. 27, 2020

(86) PCT No.: PCT/EP2020/058665
§ 371 (c)(1),
(2) Date: Sep. 29, 2021

(87) PCT Pub. No.: WO2020/201062
PCT Pub. Date: Oct. 8, 2020

(65) Prior Publication Data
US 2022/0234274 A1 Jul. 28, 2022

(30) Foreign Application Priority Data
Mar. 29, 2019 (CH) .................................. 00413/19

(51) Int. Cl.
*B29C 49/48* (2006.01)
*B29C 49/30* (2006.01)
(Continued)

(52) U.S. Cl.
CPC .......... *B29C 49/4823* (2013.01); *B29C 49/30* (2013.01); *B29C 49/64* (2013.01);
(Continued)

(58) Field of Classification Search
CPC ..... B29C 49/64; B29C 49/30; B29C 49/4823; B29C 49/04; B29C 2049/4825;
(Continued)

(56) References Cited

U.S. PATENT DOCUMENTS

| 4,206,171 A | 6/1980 | Uhlig |
| 5,041,247 A | 8/1991 | Kim |

(Continued)

FOREIGN PATENT DOCUMENTS

| CN | 1148827 A | 4/1997 |
| CN | 107257726 A | 10/2017 |

(Continued)

OTHER PUBLICATIONS

International Search Report Corresponding to PCT/EP2020/058664 dated Jun. 5, 2020.

(Continued)

*Primary Examiner* — Monica A Huson
(74) *Attorney, Agent, or Firm* — Finch & Maloney PLLC

(57) ABSTRACT

A blow molding tool (1) for a blow molding machine (1). The blow molding tool (1) comprises at least one first blow mold half (2) and one second blow mold half (3). The first blow mold half (2) has a baseplate (4) and a molding body (5). At least one mold cavity (6) with an inner wall (51) is arranged in the molding body (5). At least one region (511) of the inner wall (51) of the mold cavity (6) comprises, in the associated section of the molding body (5), separate temperature control channels (54) for controlling the temperature of the region (54).

20 Claims, 2 Drawing Sheets

Figure 1:
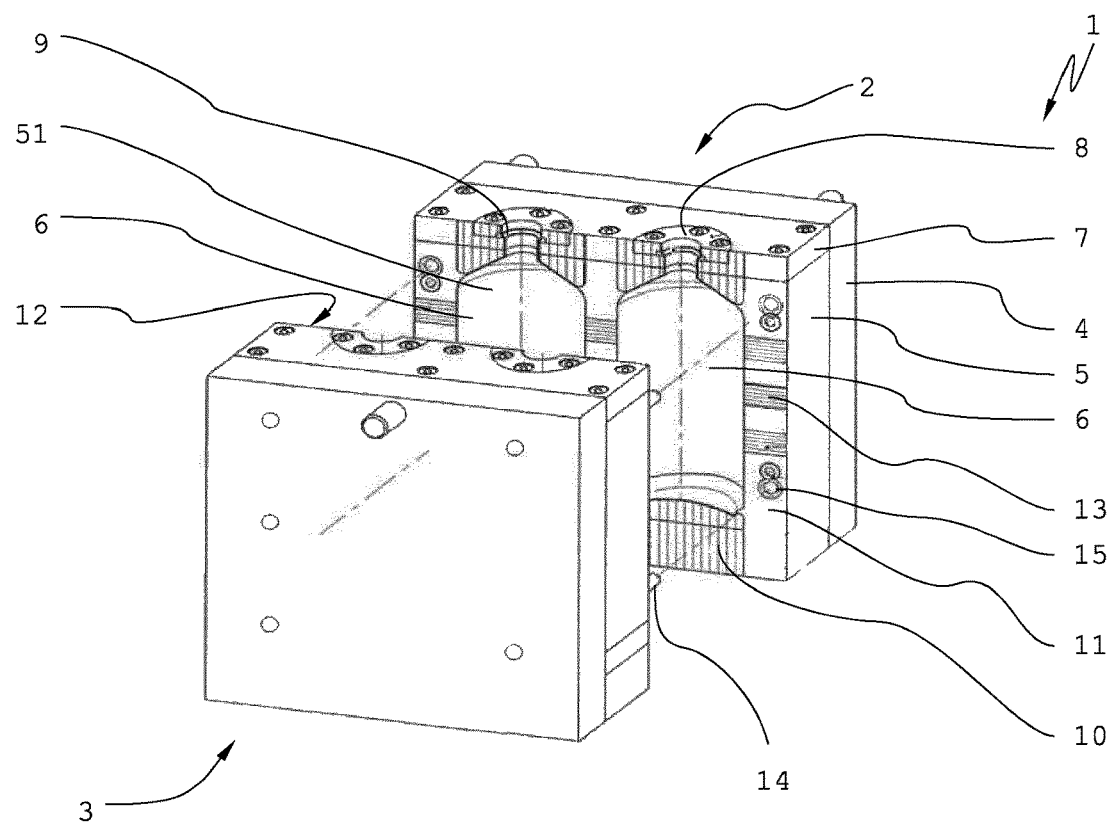

(51) Int. Cl.
  *B29C 49/64* (2006.01)
  *B29C 49/04* (2006.01)
  *B29K 23/00* (2006.01)
  *B29L 31/00* (2006.01)

(52) U.S. Cl.
  CPC ...... *B29C 49/04* (2013.01); *B29C 2049/4825* (2013.01); *B29C 2049/483* (2013.01); *B29C 2049/4838* (2013.01); *B29C 2049/4846* (2013.01); *B29C 2049/4851* (2013.01); *B29C 2049/4876* (2013.01); *B29C 2049/4879* (2013.01); *B29K 2023/00* (2013.01); *B29K 2023/12* (2013.01); *B29K 2871/00* (2013.01); *B29K 2905/02* (2013.01); *B29K 2905/12* (2013.01); *B29K 2995/0015* (2013.01); *B29K 2995/003* (2013.01); *B29L 2031/712* (2013.01); *B29L 2031/7158* (2013.01)

(58) Field of Classification Search
  CPC .... B29C 2049/4846; B29C 2049/4838; B29C 2949/0715; B29C 2049/4879; B29C 2049/4851; B29C 2049/4876; B29C 49/06; B29C 2049/483; B29C 49/48; Y02P 70/10; B29K 2905/02; B29K 2023/00; B29K 2067/003; B29K 2871/00; B29K 2995/003; B29K 2905/12; B29K 2023/12; B29K 2995/0015; B29L 2031/712; B29L 2031/7158
  See application file for complete search history.

(56) References Cited

U.S. PATENT DOCUMENTS

| | | | |
|---|---|---|---|
| 7,758,801 | B2 | 7/2010 | Künz |
| 9,296,147 | B2 | 3/2016 | Le Pechour et al. |
| 2006/0051451 | A1* | 3/2006 | Hutchinson ........... B29C 33/046 425/552 |
| 2010/0252963 | A1 | 10/2010 | Scharf et al. |
| 2011/0298162 | A1 | 12/2011 | Chomel et al. |
| 2014/0053609 | A1 | 2/2014 | Bennett |
| 2015/0151480 | A1 | 6/2015 | Brunner et al. |
| 2016/0375624 | A1 | 12/2016 | Culeron et al. |
| 2018/0079128 | A1 | 3/2018 | Rapet et al. |
| 2018/0162037 | A1 | 6/2018 | Chomel |
| 2022/0152910 | A1* | 5/2022 | Künz ................. B29C 49/4823 |

FOREIGN PATENT DOCUMENTS

| | | |
|---|---|---|
| DE | 33 01 337 A1 | 7/1984 |
| DE | 10 2010 020 090 A1 | 11/2011 |
| EP | 2 208 606 A2 | 7/2010 |
| EP | 2 703 146 A1 | 3/2014 |
| FR | 2 982 789 A1 | 5/2013 |
| GB | 1 480 647 | 7/1977 |
| GB | 2 239 626 A | 7/1991 |
| JP | H07-40426 A | 2/1995 |
| WO | 96/30190 A1 | 10/1996 |
| WO | 9933634 A1 | 7/1999 |
| WO | 00/27612 A1 | 5/2000 |
| WO | 2006/000329 A1 | 1/2006 |
| WO | 2017/005561 A1 | 1/2017 |

OTHER PUBLICATIONS

Written Opinion Corresponding to PCT/EP2020/058664 dated Jun. 5, 2020.
International Search Report Corresponding to PCT/EP2020/058665 dated Jun. 8, 2020 (Previously Submitted).
Written Opinion Corresponding to PCT/EP2020/058665 dated Jun. 8, 2020 (Previously Submitted).
International Search Report Corresponding to PCT/EP2020/058666 dated Jun. 9, 2020.
Written Opinion Corresponding to PCT/EP2020/058666 dated Jun. 9, 2020.
Indian Office Action Corresponding to 202117041378 mailed Sep. 1, 2023.
Indian Office Action Corresponding to 202117041364 mailed Jul. 7, 2023.
Chinese Office Action Corresponding to 2020800251643 mailed Jul. 20, 2023.
Chinese Office Action Corresponding to 202080025161X mailed Aug. 7, 2023.
Chinese Office Action Corresponding to 202080025162.4 mailed Aug. 5, 2023.

* cited by examiner

BLOW MOLDING TOOL AND METHOD FOR THERMALLY PROCESSING A SUBREGION OF A SURFACE OF A PLASTIC CONTAINER

The invention relates to a blow molding tool for a blow molding machine and to a method for thermally processing a subregion of a surface of a plastic container.

Single-layer or multilayer plastic containers, for example made of polyolefins, are often produced in an extrusion blow-molding method, in particular in a parison-based blow-molding method. In this case, an extrusion head is usually used to continuously extrude a plastic parison which can be formed in one or more layers. The plastic parison is introduced in sections into a mold cavity of a blow molding tool, brought into the desired shape by means of a blowing medium introduced at overpressure, cooled, and demolded. The blow molding tool usually consists of two blow mold halves, in each of which one half of the mold cavity is formed. The blow mold halves are periodically opened, closed, and opened again in order to introduce a parison section into the mold cavity and, after inflation, to demold the finished container again.

A further, very frequently used production method for plastic containers is stretch blow molding. In this method, a so-called preform, which mostly has an elongated tubular shape, a bottom at its one longitudinal end, and at the other longitudinal end a neck region with shaped fastening elements for a closure cap, for example threaded sections, is inserted into a mold cavity of a blow molding tool and brought into the desired shape by a blowing medium introduced at overpressure. In this case, the preform is additionally stretched in the axial direction with a stretching mandrel inserted through the neck opening. After the stretching/blowing process, the finished plastic container is cooled and demolded from the blow molding tool.

The single-layer or multilayer preform is typically produced in a separate injection-molding method prior to the stretch blow-molding process. It has also already been proposed to produce preforms in a plastic compression-molding method or by an extrusion blow-molding process. Polyethylene terephthalate (PET) and similar materials, such as polyethylene furanoate (PEF), or polyolefins, such as polypropylene (PP), high-density polyethylene (HDPE), or low-density polyethylene (LDPE), are used predominantly as raw material for the production of plastic containers in the stretch blow-molding process. In the so-called single-stage stretch blow-molding process, the preform is inserted into the mold cavity of the blow molding tool immediately after its production and inflated and stretched to form a plastic container. However, the plastic containers are often produced in a two-stage method. In this case, the preforms are produced in a first step and temporarily stored for later use. During the subsequent stretch blow-molding process, the preforms are first heated again, introduced into the mold cavity of a blow molding tool, stretched in the longitudinal direction with a stretching mandrel, and usually inflated by overpressure to form a plastic container conforming to the mold cavity. In this way, both processes—injection-molding and stretch blow-molding—can be run separately and optimally.

Also normally used in the stretch blow-molding process is a blow molding tool which consists of two blow mold halves in each of which a part of the mold cavity is formed. The blow mold halves are periodically opened, closed, and opened again in order to insert, inflate, and stretch the preform and to demold the finished plastic container.

The extruded parison and also the preform are uniformly referred to as preforms in their respective methods.

In order that the preform does not suffer any temperature shock during insertion into the mold cavity of the blow molding tool, which could lead to a regional freezing of the plastic material and hinder further optimum shaping in the blow molding process, the shaping inner surfaces, i.e., in particular the inner walls of the mold cavities, of the blow molding tool when the preform is being inserted, should have a temperature that does not substantially differ from the temperature of the parison. That is to say, the temperatures of the inner surfaces of the blow molding tool preferably deviate by no more than roughly 10% from the temperature of the preform at the time when the preform is being inserted. Polyolefins are typically used at a temperature of 180° C. with a deviation of up to 20 K; polyethylene terephthalate is typically used at temperatures of 240° C. to 280° C. with a deviation of up to 20 K. On the other hand, before demolding the plastic container that has been produced, the blow molding tool must be cooled down at the end of the blow molding process to the point that the polymerization process of the plastic material is largely completed and no undesired deformations can occur during further processing of the plastic container.

Polyolefins are typically demolded at about 60° C., whereby the temperature at the neck is still about 80° C., and polyethylene terephthalate is typically demolded at about 30° C., whereby the neck and bottom regions can have a higher temperature of roughly 60° C. This results in a correspondingly high temperature difference during the blow molding process.

Blow molding tools are usually constructed in a plurality of parts and are mostly made of aluminum or steel or even of non-ferrous metals. The two blow mold halves of a blow molding tool each comprise a molding body, in which at least one mold cavity is formed. The molding body is mounted on a baseplate made of steel, which is a component of the closing unit of the blow molding machine. On account of the pressures occurring during the blow molding process, the baseplates and the molding bodies must be relatively solid. Known from the injection-molding process are molding tools that are very similar in construction but have a significantly more solid design in order to withstand the pressures occurring during injection molding, which are many times higher than in blow molding methods.

Considering the relatively good thermal conduction properties of the individual components in blow molding tools, it is immediately apparent that the expenditure on the periodic heating and cooling of the blow molding tools must be very high in order to achieve reasonably acceptable cycle times and be able to produce high-quality products at the same time. It is known that the blow molding tool can be heated or cooled by means of a suitable fluid, for example water, which is circulated under pressure in channels, milled grooves and holes in the blow molding tool. In order to achieve the shortest possible cycle times, the heating/cooling fluid is conducted through the channels, milled grooves and holes at a relatively high pressure. So that the blow molding tool withstands these high pressures, it must be all the more solid. However, in conjunction with the good thermal conduction properties of the materials used for the blow molding tool, this results in an even higher expenditure on the periodic heating and cooling of the blow molding tool. In addition, the more solid design of the blow molding tool also increases the expenditure required for the periodic opening and closing of the blow mold halves.

Due to the lack of economic viability, heating the molds to the preferred temperatures described herein has so far been dispensed with. The expenditure on dissipating the introduced heat again is enormous and requires a very high cooling capacity. In addition, this prolongs the cycle time since it is necessary to hold demolding until the entire temperature difference has been eliminated. In doing so, it was accepted that the finished surfaces of the containers produced can have defects due to the excessive temperature difference. In many cases, such containers are provided with a shrunk-on outer packaging so that these defects remain concealed.

It is therefore an object of the invention to overcome at least one or more disadvantages of the prior art. In particular, a blow molding tool and/or a method for thermally processing a subregion of a surface of a plastic container is to be provided with which it is possible to provide surfaces and/or container parts with a specific temperature profile during the production process. The cycle times are preferably not prolonged in comparison to the prior art and the production costs are kept low.

This object is achieved by the devices and methods defined in the independent claims. Further embodiments result from the dependent claims.

A blow molding tool according to the invention for a blow molding machine, in particular an extrusion blow-molding tool, comprises at least one first blow mold half and one second blow mold half. The first blow mold half comprises a baseplate and a molding body. At least one mold cavity with an inner wall is arranged in the molding body. At least one region of the inner wall of the mold cavity comprises, in its associated section of the molding body, separate temperature control channels for controlling the temperature of this region. The region of the inner wall is also defined as a part of the inner wall.

The provision of separate temperature control channels enables targeted temperature control, i.e., heating or cooling, of a subregion of the mold cavity, i.e., of the region of the inner wall. On the one hand, this enables the temperature of this region to be controlled independently of the remaining molding body. On the other hand, by forming the region as a separately temperature-controlled subregion, it is smaller in relation to the mold cavity and thus has a lower mass. This enables the very rapid heating or the very rapid cooling of this region.

By definition, an associated section is understood to mean a subregion of the molding body which faces away from the inner wall and is arranged in the molding body behind the region.

It goes without saying that a plurality of regions is also possible which each comprise separate temperature control channels in their associated section of the molding body.

This enables independent temperature control of a plurality of subregions of a mold cavity. In this case, a corresponding temperature profile of a first region can be run differently from the temperature profile of a second subregion, both temporally and with regard to temperature.

Alternatively, it is also possible to provide a plurality of regions which each comprise separate temperature control channels in their associated section of the molding body, wherein these one or more regions do however comprise a common temperature control circuit, which is however independent of the remaining molding body.

This ensures that the plurality of regions have a common temperature profile.

As already explained, the mass to be heated or cooled again is significantly reduced, and heating or cooling is substantially reduced to only the region and its associated section. As a result, a very much lower energy expenditure is required for heating or cooling the region. Due to the lower mass, the heating and cooling of the molding body can be accomplished in a relatively short time. In particular, heating or cooling at a rate of 5 K/s, preferably 15 K/s, and particularly preferably 30 K/s or more, is made possible. In conjunction with polished shaping surfaces of the region and the short cooling times, the surfaces of the mold cavities, which are heated and cooled again immediately afterwards, also permit the production of plastic containers with glossy surfaces at the respective locations.

Polished surfaces are surfaces which have been processed, for example, by means of polishes and a small amount of material was removed in order to smooth a corresponding surface by removing roughness peaks and, if appropriate, to create gloss at this surface. Surfaces with an average roughness value from 0.8 pm are typically referred to as polished surfaces.

The glossiness of surfaces is expressed by means of reflectometers in so-called gloss units (GU). Reference is made herein to gloss when glossiness exceeds 10 GUs. The measurement is carried out according to ISO 2813. For completely or partially transparent objects, no reflectometer is used, but the reflectance, i.e., the quotient of reflected to irradiated light, is indicated for a specific angle. In the case of completely or partially transparent plastics, reference is made to gloss when reflectance exceeds 20%.

The design of the blow molding tool according to the invention makes it possible to achieve such glossy surfaces even with plastics, such as polyolefins, for which it is otherwise not possible, as is known, to achieve such glossy surfaces without additional working steps, such as a multi-layer design of the container or preform, in which the outermost layer, which is supposed to give rise to gloss, has low viscosity and contains different additives in order to achieve the low viscosity. With a corresponding design of the surfaces of the region, plastic containers having surfaces structured at least in subregions can also be produced. With a corresponding design of the surfaces, even containers having surfaces that are glossy in subregions of the region and structured in other subregions of the region can thus be produced.

Here structured means that the surface of the container substantially corresponds to the negative of the molding body, wherein the deviation between the negative and the later surface does not exceed 15%, preferably does not exceed 10%, and particularly preferably does not exceed 5%.

It goes without saying that when referring to the mold cavity in a blow mold half, only the part of the mold cavity that is located in the respective blow mold half is meant. The entire mold cavity is provided only by joining the blow mold halves (or parts if the blow molding tool is of more than two parts). The mold cavity corresponds substantially to the negative of the subsequent plastic container.

It can be provided that the region with its associated section is formed on a molding part formed separately from the molding body.

On the one hand, this enables the separate manufacture of the associated section and the temperature control channels contained therein; on the other hand, separate formation makes it possible to design the surface of the region differently from the surface of the remaining inner wall.

Maintenance of the blow molding tool is also simplified. It is to be expected that as a result of rapidly changing temperature profiles, the region and the associated section of the molding tool are loaded more than the remaining blow molding tool and this region with its associated section shows wear correspondingly earlier. Separate formation makes it possible to replace this worn region by replacing the molding part and to restore the blow molding tool.

The molding part may be made of aluminum or an alloy thereof. Aluminum has a lower coefficient of thermal expansion in comparison to steel. As a result, stresses, caused by thermal expansion, in an aluminum molding part arranged in a molding body made of steel are reduced in comparison to a combination of steel and steel.

In addition, it may be provided that an insulating element made of a thermally insulating material is arranged between the molding part and the molding body. Depending on the design of the molding part, the insulating element can also be referred to as an insulating block.

The mass to be heated or cooled of the region and its associated section is thus at least partially thermally decoupled from the remaining molding body. This reduces the heat transfer from the molding part to the molding body and thus reduces the mass to be cooled or heated. This reduces the energy expenditure on the one hand and makes it possible on the other hand to cool or heat the region more rapidly with the same energy expenditure.

The insulating element can consist of a thermosetting, high-temperature-resistant plastic with low thermal conductivity.

This makes a long service life possible and prevents unwanted heat flows.

These plastics are distinguished by their very low thermal conductivity, which is only 0.1-0.8 W/mK depending on the type of plastic. For use in conjunction with blow molding tools according to the invention, plastics from the group consisting of polyaryl ether ketones, such as polyether ether ketone (PEEK), polyamides, glass-fiber-reinforced plastics, and reinforced thermosets with a temperature resistance of up to at least 200° C. are in particular preferred. The plastic can in particular be a hard plastic or a hard plastic composite material. Plastics that have a hardness of at least 75 Shore are herein considered to be hard plastics.

This makes manufacture with a precise fit possible and also prevents deformations caused by high pressures during operation.

For supplying the temperature control channels, a distributor block can be arranged between the baseplate and the molding body.

A distributor block makes it possible to selectively supply a temperature control medium, i.e., a heating or cooling medium, to the temperature control channels. A replacement element can also be created by means of a distributor block, which makes it possible, by simple replacement of the distributor block, to supply a plurality of temperature control channels in a collective manner, i.e. together, or alternatively also to supply one or more regions with a temperature control medium separately.

The distributor block may be made of aluminum or an alloy thereof. The corresponding advantages of such a material selection have already been mentioned with reference to the molding part and likewise apply to the formation of the distributor block.

The distributor block can have connections for the supply and discharge of a heating/cooling medium, i.e., a temperature control medium, to the temperature control channels.

By arranging the connections on the distributor block, said connections can be easily maintained. Production is also facilitated since a distributor block typically has an extension up to the outer regions of the blow molding tool and the connections are correspondingly easily accessible.

In this case, it can be provided that a plurality of connections for supplying a plurality of temperature control channels are arranged on the distributor block and are each formed separately. This makes it possible to supply different temperature control channels separately. By replacing the distributor block, it is possible to insert quickly and easily a distributor block that has only a single set of connections and that connects all existing temperature control channels to one another so that they can be supplied simultaneously.

The molding body can be formed in a plurality of parts and comprise a neck insert and/or a bottom part. The molding body can correspondingly comprise a middle part.

This simplifies the manufacture and also the maintenance of the blow molding tool. It is thus possible, for example, to form the entire neck insert and/or the bottom part and/or the middle part as a region that comprises separate temperature control channels. Preferably, however, at least in one component of the molding body, i.e., for example, in the neck insert and/or the bottom part, preferably in the middle part, a region with an associated section that comprises separate temperature control channels is formed.

The baseplate may be made of stainless steel. The steel design ensures that the baseplate can absorb the forces that occur. The property whereby the steel is stainless prevents premature corrosion of the baseplate.

The molding body may be made of aluminum or an alloy thereof.

Since aluminum has a relatively low coefficient of thermal expansion, a high dimensional stability of the blow molding tool over a broad temperature range is made possible.

The temperature control channels may take the form of a hole. Here, a concentrically arranged tube is preferably arranged within the hole so that an annular gap forms as a temperature control channel between the tube and the hole.

Thus, for example, the temperature control medium can be introduced into the associated section of the region through the annular gap and can be brought out again through the tube, or introduced through the tube and brought out again through the annular gap. The manufacture of the temperature control channels in this manner is simple, cost-effective, and fast. When a tube fails, it can easily be replaced.

A wall thickness between the temperature control channel and the region is at least 1.5 mm and at most 12 mm. The region is part of the surface of the inner wall; in other words, a material thickness between the blown shape and the temperature control medium is 1.5 mm to 12 mm.

This dimensioning guarantees on the one hand a minimum strength caused by the minimum wall thickness and on the other hand a thermal resistivity which is limited by the maximum dimension of this remaining wall thickness. The temperature of the region can be controlled correspondingly dynamically.

The region may have a structured surface. This allows a corresponding reproduction of the structure on the container.

The second blow mold half of the blow molding tool is preferably formed correspondingly to the first blow mold half.

The term "blow mold half" is not limited to a mathematical division. In the case of asymmetric plastic containers, the separating point can be offset, but reference is nevertheless made to halves. The blow molding tool may also be formed in a plurality of parts, e.g., three parts. A blow mold half then corresponds to a part of the blow molding tool which is delimited from further parts of the blow molding tool by a first and a second separating plane.

A further aspect of the invention relates to an extrusion blow-molding machine comprising a blow molding tool as described herein.

The extrusion blow-molding machine can be configured together with the blow molding tool so that the optimum, i.e., matched, process parameters and thus correspondingly short cycle times are achieved.

A further aspect of the invention relates to a method for thermally processing a subregion of a surface of a plastic container with a blow molding tool, in particular with a blow molding tool as described herein. The method comprises the steps of:
- heating a region of a mold cavity of a molding body of a first blow mold half of the blow molding tool by supplying a heating medium through separate temperature control channels,
- introducing a preform into the mold cavity,
- closing the blow molding tool,
- shaping the plastic container by inflating the preform and abutting the preform against the inner wall of the mold cavity,
- cooling the region by supplying a cooling medium through the temperature control channels,
- demolding the plastic container.

The heating medium and the cooling medium may be identical, but they have different temperatures according to their purpose. Correspondingly, reference is made generally to a temperature control medium.

The present method enables the targeted temperature control of a region of the inflated plastic container, wherein a temperature profile differing from the remaining mold cavity can be run in this region. This enables, in particular, the rapid heating and rapid cooling of the corresponding region so that before the introduction of the preform into the mold cavity, the corresponding region substantially has a temperature that corresponds to the temperature of the preform and this temperature can be cooled to the demolding temperature after inflation, without substantially prolonging the cycle time.

The rapid heating and rapid cooling to the desired temperatures enables the precise transfer of structures from the mold cavity to the surface of the inflated plastic container. The structures may be both structured surfaces and polished surfaces. In other words, the present method makes it possible to transfer a structure from the mold cavity to the surface of the container with a deviation of less than 15%, preferably less than 10%, and particularly preferably less than 5% in comparison to the negative structure.

By controlling the temperature of only one region of the mold cavity, a method is created which extends the cycle time only negligibly since the remaining mold cavity does not necessarily have to be heated to the optimum temperatures and can be cooled continuously, for example. This relates in particular to regions which are not visible later on the plastic container and can therefore have a lower accuracy or surface finish.

In this case, it can be provided that during the shaping of the plastic container, the region has a temperature that is increased in comparison to the remaining inner wall of the mold cavity. Accordingly, the region of the plastic container that comes to abut against the region is run with a different temperature profile. This enables different surface finishes on the plastic container caused by the temperature differences.

During cooling, the region preferably has an average cooling rate of at least 5 K/s or is cooled at a cooling rate of at least 5 K/s, preferably 15 K/s, and particularly preferably 30 K/s.

This promotes rapid and thus precise solidification of the plastic container in regions that are in contact with the region of the inner wall of the mold cavity.

The molding body is preferably also cooled during cooling of the region.

This prevents overheating of the blow molding tool.

Correspondingly temperature-controlled water is preferably used as heating medium and as cooling medium.

Water has a relatively high thermal capacity and permits the cost-effective and nevertheless rapid supply of heat or cold into the temperature control channels of the section of the molding body associated with the region.

The preform preferably consists substantially of a polyolefin. The heating medium is supplied at a temperature of 120° C. to 200° C. and preferably at 160° C., and the cooling medium is supplied at a temperature of 5° C. to 40° C., preferably 15° C.

It has been found that these process parameters have a positive influence in particular on the provision of the corresponding temperature control medium since these temperatures can be achieved relatively cost-effectively.

Figure 2:
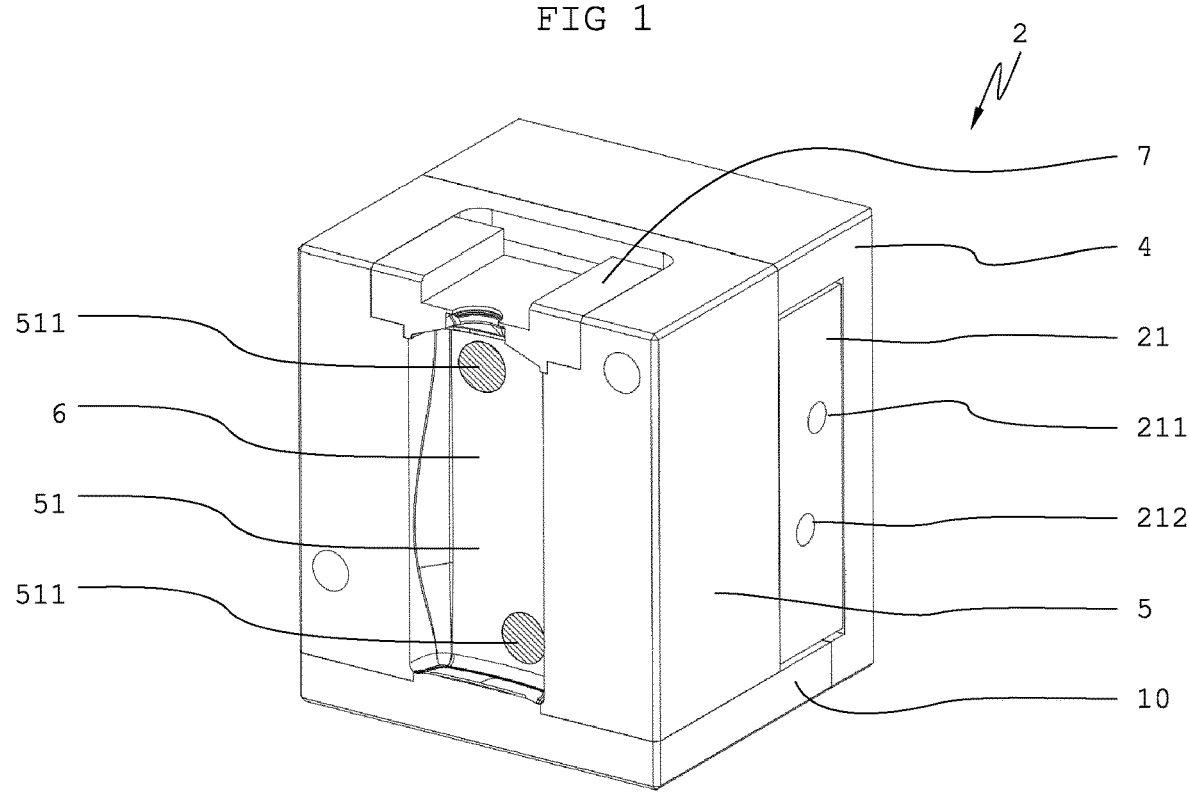
Figure 3:
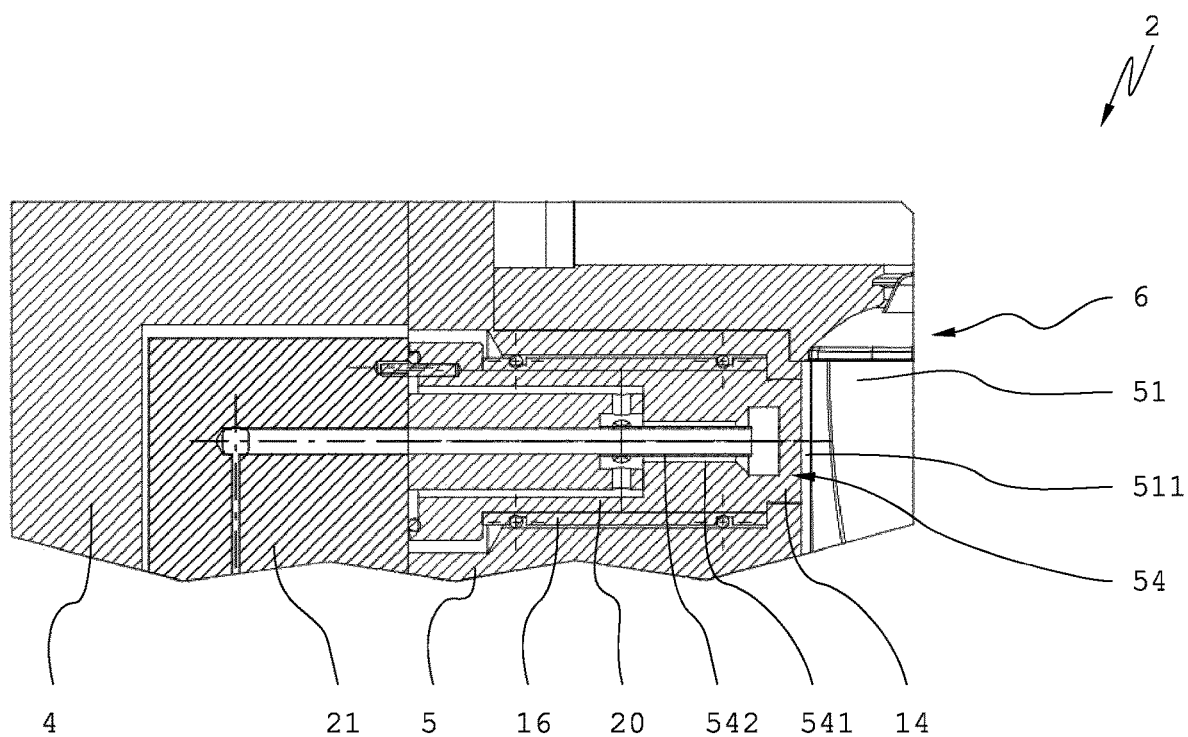

An exemplary embodiment of a blow molding tool is explained in more detail below with reference to schematic figures. These show:

FIG. 1: a prior-art blow molding tool having two blow mold halves;

FIG. 2: a first blow mold half;

FIG. 3: a vertical sectional view through the blow mold half of FIG. 2.

FIG. 1 shows a blow molding tool 1 from the prior art for explaining the basic structure of such a tool. The blow molding tool, which as a whole is provided with reference sign 1, comprises a first blow mold half 2 and a second blow mold half 3. In the present case, said blow mold halves are laterally displaceable relative to one another in order to open and close the blow molding tool 1 periodically. Each blow mold half 2, 3 comprises a baseplate 4, which forms part of a closing unit of a blow molding machine. Mounted on the baseplate 4 is a molding body 5 in which one or more mold cavities 6 are formed. According to the exemplary embodiment shown, the molding body 5 has two mold cavities 6, each defining one half of the shape of a body of a plastic container. Since the mold cavities correspond to one another, for better clarity the two mold cavities are not provided with all reference signs, although the explanations apply in each case to both mold cavities.

A head plate 7 is provided with a cavity 8 for defining a neck section of the plastic container. In the case of a blow molding tool for an extrusion blow-molding machine, a neck blade 9 for separating an extruded plastic parison inserted into the blow molding tool 1 can also be provided on the head plate 7. A bottom part 10 closes the mold cavities 6 at the other end of the blow molding tool 1. On the mutually facing surfaces 11, 12 of the blow mold halves 2, 3, which define a separating plane of the blow molding tool 1, venting slots 13 can be formed. On one of the blow mold halves 3, guide pins 14 are formed, which slide into guide bushes 15 of the other blow mold half 2 when the blow mold halves 2, 3 are closed. The molding body 5 has a wall surface, i.e., an inner wall 51, which forms a part of the mold cavity 6.

FIG. 2 shows a first blow mold half 2 of a blow molding tool according to the invention. The blow mold half 2 has a baseplate 4. Arranged on the baseplate 4 is a distributor block 21 with two connections 211 and 212 for supplying a temperature control medium. A molding body 5 and a bottom part 10, which adjoins the molding body 5, are arranged on the base body 4. A head plate 7 is embedded in the molding body 5. The entirety consisting of molding body 5, bottom part 10 and head plate 7 provides a mold cavity 6. As part of the mold cavity 6, the molding body 5 has an inner wall 51. The inner wall 51 has two regions 511, wherein an associated section with separate temperature control channels 54 (see FIG. 3 in this respect) is assigned to each region 511. The temperature control channels 54 are connected to the connections 211 and 212 via the distributor block 21.

FIG. 3 shows a vertical sectional view through one of the regions 511 of FIG. 2. From this sectional view, it can be seen that the region 511 is formed as part of the inner wall 51. The region 511 has an associated section, on which a molding part 20 formed separately from the molding body 5 is formed. At its end facing the mold cavity 6, the molding part 20 is embedded in the molding body 5 and subsequently. in the direction of the baseplate 4, spaced apart from the molding body 5 with an insulating element 16. For better insulation, the insulating element 16 is additionally spaced apart from the molding body 5 by two O rings.

The temperature control channels 54 are formed within the molding part 20. To this end, a hole 541 is provided in the molding part 20 and a tube 542 opens into or penetrates through this hole 541 lengthwise so that an annular gap is formed between the tube 542 under the inner wall of the hole 541 through which the temperature control medium can be conducted into the vicinity of the region 511 or can be discharged therefrom. The tube 542 opens into a corresponding channel on the distributor block 521 and accordingly, the annular gap opens into a further channel on the distributor block 21. These channels open correspondingly into the connections 211 and 212 (see FIG. 2).

The cooling channel 54 has an extension at its end adjacent to the region 511 so that the cooling channel 54 forms a chamber. This chamber connects the ring gap and the tube so that a cooling circuit can be provided. The chamber is spaced from the mold cavity 6 with a wall thickness, which in the present case is 3 mm. This ensures that the heat that this wall thickness has, for example, after blow molding, can be dissipated quickly, or that the wall thickness can be rapidly heated with a suitable heating medium so that its temperature substantially corresponds to that of the preform that is introduced into the mold cavity 6 for blow molding.

In the method for producing a plastic container and for thermally treating a subregion of a plastic container, which is described across all figures, the region 511 of the mold cavity 6 of the molding body 5 of a first blow mold half 2 of the blow molding tool 1 is first heated by supplying a temperature control medium through separate temperature control channels 54. The preform is then introduced into the mold cavity 6. Subsequently, the blow molding tool 1 is closed and the plastic container is shaped by inflating the preform and by abutting the preform against the inner wall 51 of the mold cavity 6. After the shaping, the region is cooled by supplying a cooling medium through the temperature control channels 54 and the plastic container is demolded when a specific cooling temperature is reached.

The invention claimed is:

1. A blow molding tool (1) for a blow molding machine (1), comprising
at least one first blow mold half (2) and one second blow mold half (3),
wherein the first blow mold half (2) comprises a baseplate (4) and a molding body (5),
at least one mold cavity (6) with an inner wall (51) is arranged in the molding body (5),
at least one region (511) of the inner wall (51) of the mold cavity (6) comprises, in its associated section of the molding body (5), separate temperature control channels (54) for controlling a temperature of the region (511), wherein the at least one region (511), with its associated section, is formed on a molding part (20) which is formed separately from the molding body (5).

2. The blow molding tool (1) according to claim 1, wherein the molding part (20) is made of aluminum or an alloy thereof.

3. The blow molding tool (1) according to claim 1, wherein an insulating element (16), made of a thermally insulating material, is arranged between the molding part (20) and the molding body (5).

4. The blow molding tool (1) according to claim 3, wherein the insulating element (16) consists of a thermosetting, high-temperature-resistant plastic with low thermal conductivity.

5. The blow molding tool (1) according to claim 1, wherein a distributor block (21), for supplying the temperature control channels (54), is arranged between the baseplate (4) and the molding body (5).

6. The blow molding tool (1) according to claim 5, wherein the distributor block (21) is made of aluminum or an alloy thereof.

7. The blow molding tool (1) according to claim 5, wherein the distributor block (21) has connections for supply and discharge of a heating/cooling medium to the temperature control channels (54).

8. The blow molding tool (1) according to claim 1, wherein the molding body (5) is formed in a plurality of parts and comprises a neck insert (18) and/or a bottom part (10).

9. The blow molding tool (1) according to claim 1, wherein the baseplate (4) is made of stainless steel.

10. The blow molding tool (1) according to claim 1, wherein the molding body (5) is made of aluminum or an alloy thereof.

11. The blow molding tool (1) according to claim 1, wherein the temperature control channels (54) are formed as a hole (541), and a concentrically arranged tube (542) is arranged within the hole (541) so that an annular gap forms as a temperature control channel (54) between the tube (541) and the hole (542).

12. The blow molding tool (1) according to claim 1, wherein a wall thickness between the temperature control channel (54) and the at least one region (511) is at least 0.059 inches (1.5 mm) and at most 0.472 inches (12 mm).

13. The blow molding tool (1) according to claim 1, wherein the at least one region (511) has a structured surface.

14. An extrusion blow-molding machine comprising a blow molding tool (1) according to claim 1.

15. A method for thermally processing a subregion of a surface of a plastic container with the blow molding tool (1) according to claim 1, comprising the steps of
heating the at least one region (511) of the mold cavity (13) of the molding body (5) of the first blow mold half (2) of the blow molding tool (1) by supplying a heating medium through separate temperature control channels (54),
introducing a preform into the mold cavity (6),
closing the blow molding tool (1), shaping the plastic container by inflating the preform and abutting the preform against the inner wall of the mold cavity (6), cooling the at least one region (511) by supplying a cooling medium through the temperature control channels (54), and demolding the plastic container.

16. The method according to claim 15, wherein during the shaping of the plastic container, the at least one region (511) has a temperature which is higher than a temperature of the remaining inner wall of the mold cavity (6).

17. The method according to claim 15, wherein the at least one region (511) is cooled, during cooling, at an average cooling rate of at least 5 K/s.

18. The method according to claim 15, wherein the molding body (5) is also cooled during the cooling of the at least one region (511).

19. The method according to claim 15, wherein correspondingly temperature-controlled water is used as a heating medium and as a cooling medium.

20. The method according to claim 15, wherein the preform consists substantially of a polyolefin, the heating medium is supplied at a temperature of 248° F. to 392° F. (120° C. to 200° C.) and the cooling medium is supplied at a temperature of 41° F. to 104° F. (5 to 40° C.).

\* \* \* \* \*